(12) United States Patent
Ding et al.

(10) Patent No.: US 11,019,530 B2
(45) Date of Patent: May 25, 2021

(54) TRANS-LAYER BIDIRECTIONAL ROBUST HEADER COMPRESSION SYSTEM

(71) Applicant: The Regents of the University of California, Oakland, CA (US)

(72) Inventors: Zhi Ding, Davis, CA (US); Wenhao Wu, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/495,054

(22) PCT Filed: Mar. 22, 2018

(86) PCT No.: PCT/US2018/023806
§ 371 (c)(1),
(2) Date: Sep. 17, 2019

(87) PCT Pub. No.: WO2018/203982
PCT Pub. Date: Nov. 8, 2018

(65) Prior Publication Data
US 2020/0059822 A1 Feb. 20, 2020

Related U.S. Application Data

(60) Provisional application No. 62/502,373, filed on May 5, 2017.

(51) Int. Cl.
*H04W 28/06* (2009.01)
*H04L 1/18* (2006.01)
(Continued)

(52) U.S. Cl.
CPC ........... *H04W 28/06* (2013.01); *H04L 1/1819* (2013.01); *H04L 69/04* (2013.01); *H04L 69/22* (2013.01); *H04W 80/02* (2013.01)

(58) Field of Classification Search
CPC .... H04W 28/06; H04W 80/02; H04L 1/1819; H04L 69/04; H04L 69/22
See application file for complete search history.

(56) References Cited

U.S. PATENT DOCUMENTS 7,948,913 B1 * 5/2011 Dinan .................. H04L 1/0027
370/252
8,537,708 B2 * 9/2013 Yabe .................... H04L 1/1854
370/252
(Continued)

OTHER PUBLICATIONS

International Search Report and Written Opinion of the Korean Patent Office for PCT Patent Application No. PCT/US2018/023806 dated Jul. 4, 2018.
(Continued)

*Primary Examiner* — Ivan O Latorre
(74) *Attorney, Agent, or Firm* — Park, Vaughan, Fleming & Dowler LLP

(57) ABSTRACT

The system obtains packets-to-be-compressed at a compressor at a transmitter that transmits packets through a channel to a decompressor at a receiver. It also obtains cross-layer information regarding a state of the channel from lower-layer network entities in the transmitter. The system then determines whether to request feedback from the decompressor based on a predetermined policy, and requests and receives feedback from the decompressor based on the determination. The system uses the cross-layer information and any received feedback to estimate a state of the channel and the decompressor. The system also determines a compression level based on a compression policy and the estimations for the state of the channel and the decompressor. The system generates the packets-to-be-transmitted by selectively compressing the headers of the packets-to-be-compressed based on the determined compression level.

24 Claims, 9 Drawing Sheets

(51) Int. Cl.
*H04L 29/06* (2006.01)
*H04W 80/02* (2009.01)

(56) References Cited

U.S. PATENT DOCUMENTS

| | | | |
|---|---|---|---|
| 8,948,206 B2 | 2/2015 | Pelletier et al. | |
| 2002/0059464 A1* | 5/2002 | Hata | H04L 69/04 709/247 |
| 2004/0047301 A1* | 3/2004 | Poikselka | H04L 69/04 370/261 |
| 2004/0073711 A1* | 4/2004 | Pelletier | H03M 7/30 709/247 |
| 2005/0090273 A1* | 4/2005 | Jin | H04L 69/04 455/502 |
| 2005/0144326 A1* | 6/2005 | Sugar | H04L 65/1006 709/247 |
| 2006/0198393 A1* | 9/2006 | Lamy | H04L 69/32 370/469 |
| 2006/0262812 A1* | 11/2006 | Liu | H04L 69/04 370/477 |
| 2008/0151861 A1* | 6/2008 | Zhang | H04L 47/26 370/349 |
| 2011/0010164 A1* | 1/2011 | Williams | G10L 15/063 704/9 |
| 2012/0189023 A1 | 7/2012 | Huang et al. | |
| 2013/0083702 A1* | 4/2013 | Barany | H04W 28/06 370/261 |
| 2015/0312875 A1* | 10/2015 | Bhanage | H04W 64/003 455/456.1 |
| 2015/0382243 A1 | 12/2015 | Liu et al. | |
| 2016/0183123 A1* | 6/2016 | Chebolu | H04L 69/04 370/329 |
| 2016/0241685 A1 | 8/2016 | Shah et al. | |
| 2016/0381598 A1* | 12/2016 | Chan | H04W 28/06 370/474 |
| 2017/0231023 A1* | 8/2017 | Adachi | H04L 69/40 |
| 2018/0019908 A1* | 1/2018 | Ding | H04L 69/22 |
| 2020/0304604 A1* | 9/2020 | Zhao | H04W 28/06 |

OTHER PUBLICATIONS

Nicholas Roy, "Finding Approximate POMDP Solutions Through Belief Compression", Journal of Artificial Intelligence Research, vol. 23, Jan. 1, 2005, pp. 1-40.

* cited by examiner

TRANS-LAYER BIDIRECTIONAL ROBUST HEADER COMPRESSION SYSTEM

CROSS-REFERENCE TO RELATED APPLICATION

This application claims the benefit of U.S. Provisional Patent Application Ser. No. 62/502,373, entitled "Trans-Layer Bidirectional Robust Header Compression (ROHC) Compressor System," by inventors Zhi Ding and Wenhao Wu, filed on 5 May 2017, the contents of which are incorporated by reference herein.

GOVERNMENT LICENSE RIGHTS

This invention was made with United States government support under Grant Nos. CNS-1443870 and CCF-1321143 awarded by the National Science Foundation. The United States government has certain rights in the invention.

BACKGROUND

Field

The disclosed embodiments generally relate to techniques for improving the performance of wireless communication networks and related systems. More specifically, the disclosed embodiments relate to a new design for a bidirectional RObust Header Compression (ROHC) system, which uses trans-layer information and feedback from a decompressor to improve the performance of packet-header-compression operations in the wireless communication systems.

Related Art

In modern digital wireless communication systems, a series of information-bearing "0"s and "1"s is divided into a sequence of packets before being transmitted from a sender to a receiver. To ensure successful delivery of these payload bits, additional information must be attached to each packet as a "header" so that the receiver knows how to handle and interpret the data. Consequently, each packet is composed of a "header" and a "payload." However, in many applications, the header can be so large that only a small portion of each packet is carrying useful information and the transmission becomes very inefficient. Fortunately, the headers in successive packets are usually highly correlated, which means that the transmitter can compress the headers, and the receiver is able to decompress them based on context acquired from the previously received headers. This is technique is known as RObust Header Compression (ROHC).

However, because a wireless channel is not error-free, the transmitter cannot always send compressed headers, because the loss of some packets can cause a decompressor in the receiver to lose context synchronization and thus become unable to decompress subsequent headers although they are successfully received. One approach to address this problem is to introduce a bidirectional ROHC where there exists a feedback channel so that the decompressor can communicate its context with the compressor. However, sending frequent feedback can be costly and existing header-compression frameworks cannot address the tradeoff between compression efficiency and feedback overhead.

Hence, what is needed is a bidirectional ROHC technique that operates effectively without excessive and costly feedback.

SUMMARY

The disclosed embodiments relate to a system that compresses packets. During operation, the system obtains packets-to-be-compressed at a compressor located at a transmitter that transmits packets through a channel to a decompressor located at a receiver. The system also obtains cross-layer information regarding a state of the channel from lower-layer network entities in the transmitter. The system then determines whether to request feedback from the decompressor based on a predetermined policy, and requests and receives feedback from the decompressor based on the determination. Next, the system uses the cross-layer information and any received feedback to generate estimations for a state of the channel and a state of the decompressor. The system also determines a compression level for the packets-to-be-compressed based on a compression policy and the estimations for the state of the channel and the state of the decompressor. Finally, the system generates the packets-to-be-transmitted by selectively compressing the headers of the packets-to-be-compressed, wherein the headers are compressed at different levels based on the determined compression level, and then transmits the packets-to-be-transmitted through the channel to the receiver.

In some embodiments, determining the compression level and whether to request the feedback involves thresholding soft belief information on a current state of the decompressor.

In some embodiments, determining the compression level and whether to request the feedback involves using a partially observable Markov decision process (POMDP) to select an action based on a pre-computed policy set and belief information on the state of the channel and the state of the decompressor.

In some embodiments, generating the estimations for the state of the channel and the state of the decompressor involves using a Markov state transition model.

In some embodiments, system additionally determines whether to reconfigure feedback settings of the decompressor based on the cross-layer information. If a determination is made to reconfigure the feedback settings, the system sends a reconfiguration message to the decompressor to reconfigure settings of a decompressor-state feedback mechanism.

In some embodiments, the received cross-layer information is received from lower-layer network entities in the transmitter.

In some embodiments, the received cross-layer information is obtained from feedback sent by the receiver and includes cross-layer information from lower-layer network entities in the receiver.

In some embodiments, upon receiving the configuration message, the receiver reconfigures settings of the decompressor-state feedback mechanism.

In some embodiments, the reconfiguration is at least partly based on cross-layer information obtained from lower-layer network entities in the receiver.

In some embodiments, generating the packets-to-be-transmitted additionally involves compressing portions of packet payloads for which latency is critical.

In some embodiments, the receiver proactively sends feedback to the transmitter based on information obtained from lower-layer network entities in the receiver.

In some embodiments, the different levels of header compression include the following: no header compression; partial header compression; and full header compression.

In some embodiments, compressing the headers includes using a Window-based Least Significant Bit (WLSB) technique to compress the headers.

In some embodiments, the cross-layer information comprises one or more of the following: a state transition probability of the channel; packet error rates under different channel states; channel state estimation; and transmission-status estimation.

In some embodiments, the cross-layer information is derived from one or more of the following: a physical-layer channel model; modulation and coding schemes; Automatic Repeat Request (ARQ) feedback; Hybrid ARQ (HARM) feedback; packet segmentation information; and packet concatenation information.

In some embodiments, the lower-layer network entities comprise MAC/PHY layer entities in the transmitter.

DETAILED DESCRIPTION

Figure 1:
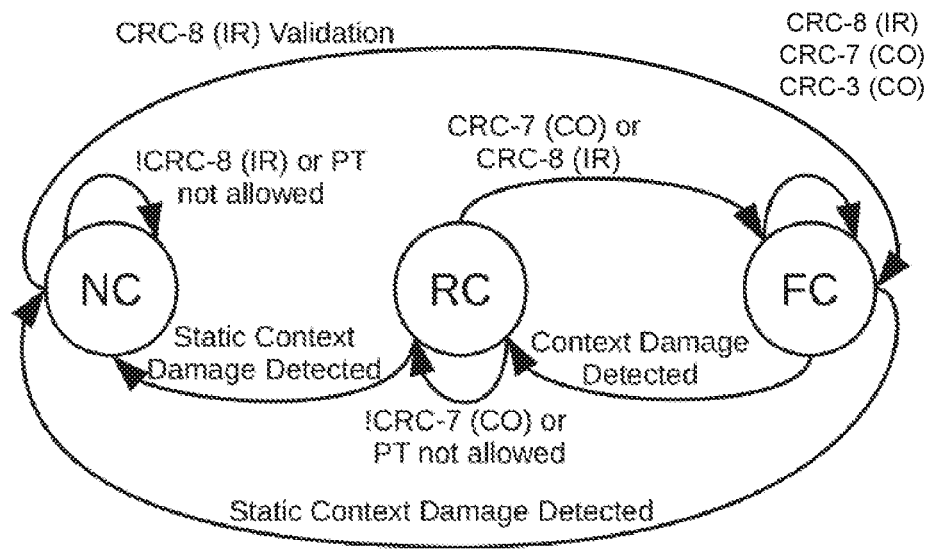
FIG. 1 illustrates a finite-state machine model of an ROHC decompressor.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), flash drives and other portable drives, or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

The disclosed embodiments relate to a new compressor design for bidirectional trans-layer ROHC that uses feedback from a decompressor. This new compressor design not only determines the compression level for each packet based on its belief regarding the channel and the receiver's states, but also determines when to request feedback if the state belief is obscured. This technique enables the compressor to exploit a potentially imperfect and delayed estimation on the channel state, and determining whether previous transmissions were successful or not, which are estimated using trans-layer information available from the MAC/PHY layer entity in the transmitter. Our proposed ROHC compressor, which is based on partially observable Markov decision process (POMDP), uses these estimates along with feedback and packets with full headers to update its belief in the channel and the decompressor's state. This enables the compressor to determine the optimal compression level and whether to request feedback based on a pre-computed policy set. As a result, the compressor outputs packets with headers compressed as different levels along with feedback requests. Note that the POMDP framework is open enough to exploit additional trans-layer information to achieve even better performance.

In another embodiment, the system does not determine the optimal action based on a POMDP approach, which might be too computationally expensive. Instead, the system determines the compression level and determines whether to request feedback by soft belief information on the decompressor's current state. This lower-complexity approach enables the bidirectional ROHC to be adapted to wireless links with very long delays for the trans-layer information and feedback, while maintaining high transmission efficiency and low feedback overhead.

Details

An ongoing trend for the wireless infrastructure to converge toward all-Internet Protocol (IP) packet-switched architecture has been witnessed in the past decade, in parallel with the demand to continuously enhance the network efficiency subject to bandwidth and other practical resource constraints. It is becoming evident that to further improve the performance of wireless networks, it no longer suffices to only focus on MAC and PHY layer techniques, which have been thoroughly investigated in the past few decades. Instead, examining the IP-based protocol stacks over wireless infrastructures from a trans-layer perspective will potentially lead to performance improvements that are unforeseen by existing researchers.

An important transmission-efficiency technique for IP-based wireless networks is the RObust Header Compression (ROHC) technique. The ROHC technique is motivated by the fact that, for many applications such as VoIP, interactive media, sensor networks, and Internet-of-Things (IoT), the size of headers is usually comparable to (or even larger than) the payloads in a packet stream, which leads to severe competition over limited radio resources. On the other hand, headers that belong to a single packet stream are usually compressible, because many fields remain unchanged (e.g., source and destination address) or change non-abruptly (e.g., serial number) throughout the lifespan of the connection. Located between the IP/UDP/RTP layers and the RLC/MAC/PHY layers, the ROHC is responsible for removing the redundancy in the header streams that could otherwise severely degrade the network data-transfer rates achievable by PHY/MAC layers. ROHC is specifically designed for wireless links with larger packet-error rates (PERs) and longer round-trip times (RTTs) than wired links to achieve a balance between compression efficiency and robustness against poor channel conditions. To date, ROHC has been standardized for various header profiles and found application in many scenarios, including LTE, satellite links, underwater acoustic networks, and tactical edge networks. Thanks to the rapid growth of IoT, whose data link layer is usually characterized by limited packet size and high PER, it is foreseeable that ROHC will play an even more critical role in the near future as a key enabling technology.

Surprisingly, although ROHC has been widely deployed in various modern wireless systems, to date it has only received modest research attention. Most existing research has focused on simulation-based performance evaluations, which are highly dependent on system settings and simulation environments and naturally leads to emphasis on empirically fine-tuning ROHC parameters. To date, very little research has focused on analytical approaches for modeling the header-compression mechanism. This work studies how different performance measurements (such as compression efficiency, robustness, transparency, probability of Out-of-Synchronization (OoS), the average number of bits to compress RTP sequence number, etc.) are affected by various design parameters, such as: the encoding codebook, the window width of the Window-based Least Significant Bit (WLSB) encoding technique, the context refresh period, the channel and packet source characteristics, and so forth.

One common limitation, which burdens existing ROHC standards and limits most research from further performance improvements, is to confine the functionality of ROHC within a single layer of the protocol stack. Despite the fact that ROHC is designed specifically for wireless packet-switch links, so far very few attempts have been made to let ROHC exploit trans-layer information, which is always available from the protocol infrastructure, to guide the operations of the ROHC compressor and decompressor, and which could potentially boost the performance of header compression at little or no additional cost. For instance, Barber proposes to examine the HARQ feedback from the MAC layer to deduce whether a packet has been transmitted successfully or not without dedicated feedback. (See P. Barber, "Cross Layer Design for ROHC and HARQ," *IEEE 802.16 Broadband Wireless Access Working Group,* 2009.) However, this work relies on the less-practical assumption of error-free and zero-delay trans-layer information. Inspired by this trans-layer design philosophy, in our recent work, we propose a trans-layer control framework for unidirectional ROHC based on a partially observable Markov decision process (POMDP), an optimal control strategy that has found application in many fields and has recently drawn great research attention in wireless communications. (See [Wu2017] W. Wu and Z. Ding, "On efficient packet switched wireless networking: A Markovian approach to trans-layer design and optimization of ROHC," *IEEE Transactions on Communications,* vol. 16, issue 7, pp. 4232-4245, July 2017.) This novel ROHC framework demonstrates significant performance gains over conventional timer-based design, even when the trans-layer information has moderate error probabilities and non-zero delays.

Encouraged by these results, in this work we study the trans-layer control framework for bidirectional ROHC. Different from the unidirectional ROHC, the decompressor is allowed to send feedback about the decompressor's state to the compressor so that the compressor can adjust the compression level accordingly. Although this design seems to simplify the control logic of the ROHC compressor, in many scenarios with limited feedback resources one must achieve a balance between the compression performance and the feedback overhead. We propose a requested-feedback bidirectional ROHC in which feedback is transmitted only when requested by the compressor when the trans-layer information alone is not sufficient for it to determine the optimal header compression level. In other words, the ROHC feedback and trans-layer information are complementary. Now that the compressor needs to make two decisions for each packet to be transmitted, namely the compression level and whether or not to request feedback, we formulate the optimal control process into another POMDP to achieve a flexible trade-off between feedback rate and transmission efficiency. However, compared to our previous work, this bidirectional design, which is based on POMDP, suffers more from the so-called "curse of dimensionality" as the delay of the trans-layer information and ROHC feedback increases. To alleviate this problem, we propose an alternative control scheme based on a belief update process similar to that of POMDP but that does not involve solving a POMDP instance with the associated prohibitive complexity that grows exponentially with respect to the delay. Simulation results show that both design schemes achieve more flexible trade-offs than conventional bidirectional ROHC designs, which facilitates operations for much worse channel conditions and longer delays.

System Model

Notations

We use regular font, bold lower-case, bold upper-case, and calligraphic letters, respectively, to denote scalars, vectors, matrices, and sets. $(\bullet)^T$ indicates matrix transpose. Let $\{A\}_{ij}$ and $\{a\}_i$ be the (i,j)-th entry of A and the i-th entry of a. Let $\mathcal{A} \times \mathcal{E}$ denote the Cartesian product of sets $\mathcal{A}$ and $\mathcal{E}$.

We define an indicator function 1[expr]=1 if logical expression "expr" is true and 1[expr]=0 otherwise.

Introduction to ROHC System

Taking 46 LTE as an example, the ROHC mechanism is located in the Packet Data Convergence Protocol (PDCP) sublayer, which connects the IP infrastructure and the Radio Link Control (RLC) sublayer. A key function of the PDCP layer is to convert the highly redundant headers from upper layers (e.g., IP, UDP, TCP, etc.) into significantly shorter PDCP packet headers, thereby saving limited precious wireless bandwidth for data payload. On the other hand, since ROHC relies on the context of successive IP packets from a single stream to remove redundancies, the decompression failure of one PDCP packet, usually caused by successive packet errors from lower layers, will have severe consequences as subsequent PDCP packets will also suffer from decompression failures even though the transmissions are successful. Consequently, it is critical for ROHC to achieve a trade-off between compression ratio and robustness against channel errors.

Consider the system model defined for ROHCv2, in which the ROHC decompressor is modeled as a finite state machine (FSM) as shown in FIG. 1. The decompressor maintains a "context" based on which it recovers compressed headers. This context consists of a static part in the header fields, which is expected to remain constant throughout the packet stream lifetime (e.g., IP address), and a dynamically changing part in the header fields (e.g., RTP timestamp).

At the start of each packet flow, the ROHC decompressor is in a "No Context" (NC) state and cannot perform context-based decompression. Hence, the ROHC compressor sends Initialization and Refresh (IR) packets with full headers to establish context synchronization between ROHC compressor and decompressor. Upon successfully recovering one of the IR packet headers, the decompressor enters a "Full Context" (FC) state, after which packets with fully compressed (CO) headers with a 3-bit CRC (CO3) can be sent, received, and decompressed. Because wireless links between ROHC compressor and decompressor are not ideal, decompression failures can occur. Repeated header failures can lead to context damage, thereby causing the decompressor to enter lower (RC or NC) states. If context damage is detected in the dynamic portion, the decompressor transitions to a "Repair Context" (RC) state, from which successful decompression of either an IR packet or a weakly compressed CO packet with a 7-bit CRC ($CO_7$) with extra context information can repair the dynamic context, which allows the decompressor to transition back to FC. If static context damage is detected in either the FC or RC states, the decompressor transitions downward to the NC state, from which only successful recovery of an IR packet can return the decompressor to the FC state.

The ROHC compressor is responsible for controlling the header type for each packet based on its confidence or estimate of its decompressor state. A key header compression algorithm is called the Least Significant Bits (LSB) encoding. An interpretation interval of size $2^k$ is defined for a k-bit encoding scheme such that the header field can be compressed and decompressed so long as its value with respect to a reference value, namely the last value transmitted, falls within this interval. Nevertheless, due to the potential packet loss caused by the channel, the reference value seen by the compressor and the decompressor may not be the same, which leads to a compression/decompression failure. A robust version of LSB called. Window-based Least Significant Bits (WLSB), is used for many header fields, which increments by a small constant for each packet. In this technique, the compressor maintains W reference values with a sliding window. The number of LSBs used to encode a new value is determined as the maximum numbers of LSBs needed with respect to each of the W reference values. Consequently, as long as the decompressor's reference value resides in the sliding window, it is able to decompress the LSB-encoded header field. In other words, a WLSB-encoded field can be decoded if there is a chain of consecutive decompression failures of length less than W. In practice, the WLSB technique may also be restricted by the maximum number of LSBs, denoted as $k_{max}$, which can be used to encode a header field, so that a too abrupt change cannot be compressed and a full header must be sent.

In the bidirectional mode of operation, the ROHC decompressor sends feedback so that the compressor can adjust its compression level accordingly. Although the compressor always starts in unidirectional mode, where there is no feedback and the compressor relies on periodic refreshes to avoid the propagation of context damage, once decompressor feedback is received, the compressor will assume that such feedback is always available for this ROHC session, and the compressor fully relies on this "reliable" feedback channel in the subsequent bidirectional mode. Although feedback is helpful for the compressor to decide the right header type to transmit, operators should expect that the decompressor should limit the rate of its feedback for bandwidth conservation. However, questions remain as to how ROHC design should balance the design trade-offs among feedback rate, throughput, and compression reliability. In this work, we propose a compressor-initiated feedback scheme, in which the compressor requests feedback from the decompressor according to its belief regarding the system's state and how it weighs the ROHC performance and the feedback overhead.

Channel Model

The Gilbert-Elliot model is based on a Markov chain with a "good" state and a "bad" state. (See L. Badia, N. Baldo, M. Levorato, and M. Zorzi, "A Markov framework for error control techniques based on selective retransmission in video transmission over wireless channels," *IEEE J. Sel. Areas Commun.*, vol. 28, no. 3, pp. 488-500, April 2010.) However, the practicality of such a model is questionable in that the channel quality may not be so clearly divisible into only two states. Moreover, the assumption that a transmission in the "good" state always succeeds and a transmission in the "bad" state always fails is even less realistic. Due to error-control measures in lower protocol layers such as link-adaptation and HARQ, a more accurate model to characterize the ROHC channel would be a Markov chain with more than two states, each associated with a known probability of successful transmission, as suggested in the original Gilbert-Elliott model. The parameters defining such a channel model can either be estimated, or derived from the physical layer channel. Furthermore, due to the impact of vastly different packet sizes due to different header compression levels, a given lower-layer configuration will result in different packet error characteristics for different types of headers.

As in our recent work [Wu2017], we adopt a general K-state Markov chain with states $\mathcal{K} = \{0, 1, \ldots, K-1\}$ to model the ROHC packet channel. Such a channel model is characterized by its transition probability from $s_H$ to $\bar{s}_H$, denoted as $p(\bar{s}_H | s_H)$, $s_H, \bar{s}_H \in \mathcal{K}$, as well as the probability of a successful transmission of a packet of type a under the channel state $\bar{s}_H$, denoted as $p(\bar{s}_T | a, \bar{s}_H)$, $a \in \mathcal{A}$ and $\bar{s}_H \in \mathcal{K}$, where $\bar{s}_T \in \bar{\mathcal{S}} = \{0,1\}$ represents the events of a failed or successful packet transmission, respectively.

A New Trans-Layer Bidirectional ROHC Compressor

Assumptions and Notations for State Variables

In the following section, we make a few assumptions on our system model under study to facilitate simple yet meaningful analysis:

A1—The three types of headers and the payload capsules in a packet have fixed lengths, denoted as $H_0$, $H_1$, $H_2$ and $L_F$, respectively, such that $H_0 > H_1 > H_2$ would reflect different compression levels of IR, $CO_7$ and $CO_3$ headers. The total lengths of the IR, RC and CO packets are denoted as $L_0$, $L_1$ and $L_2$, respectively, where $L_i = H_i + L_P$, i=0, 1, 2.

A2—The static part of the header remains unchanged throughout the lifetime of the packet flow; therefore, the successful transmission of only one IR packet is needed for the decompressor to establish the static context.

A3—The compressibility of the dynamic part of the header follows a Markov process. Apart from context damage due to consecutive packet loss, if a header is not compressible, an IR or RC header also needs to be transmitted to repair the context.

The reasoning behind assumptions A1 and A2 is explained in [Wu2017]. To make the ROHC system model more accurate and practical, we introduce the Markov header source model represented as the compressibility in assumption A3, which is a simplification of [Cho2006] based on two considerations. (See [Cho2006] C. Y. Cho, W. K. G. Seah, and Y. H. Chew, "A framework and source model for design and evaluation of robust header compression," *Comput. Netw.*, vol. 50, no. 15, pp. 2676-2712, October 2006.) First, the compressor is usually co-located at the packet source in practice and thus it appears unnecessary to introduce a channel model between the source and a remote compressor. Second, the compressibility based on the delta processing depends on up to the (W−1)-th order probabilities, which results in a state space of size growing exponentially with respect to W.

Figure 2:
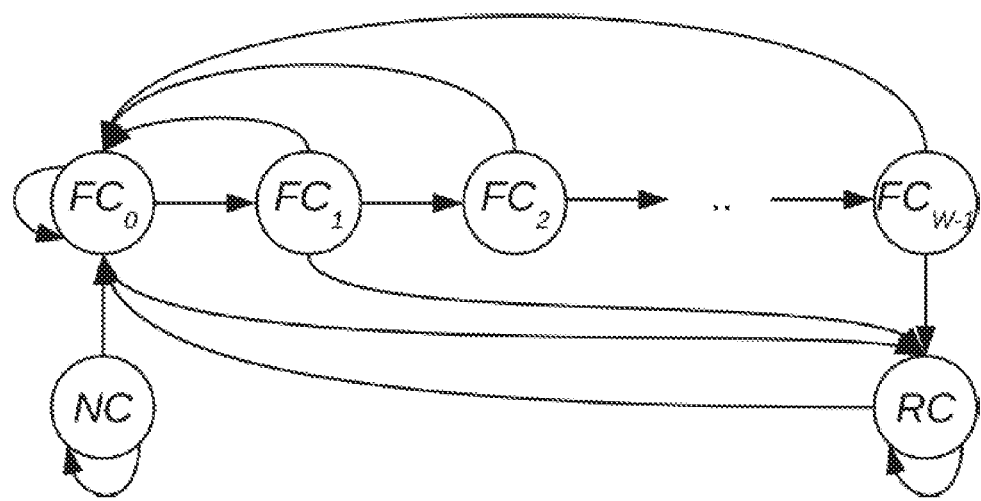
FIG. 2 illustrates a finite-state machine model of an ROHC decompressor for a least-significant-bit-encoded field.

As a result of assumptions A2 and A3, the decompressibility of the ROHC system can be represented as a finite state machine (FSM) in FIG. 2, where $FC_l$, l=0, ..., W−1 represents the decompressor being in FC state when the last l consecutive packets have been lost, and NC, RC denote states as they are named. Denote $s_S$ as the state of the header source, where $s_S = 1$, and 0 represents whether or not the header can be compressed. Let variable $a_C$ denote the type of compressed header, where $a_C \in \mathcal{T} = \{0, 1, 2\}$ correspond to IR, $CO_7$, $CO3$, respectively. Also, denote $s_T \in \bar{\mathcal{S}} = \{0, 1\}$ as a failed or successful packet transmission, respectively. For notational convenience, we let $s_D = W$ and $s_D = W+1$ denote the decompressor state for RC and NC, respectively. Adding $s_D = l$, l=0, ..., W−1 for the decompressor in $FC_l$ state, the decompressor's state space is $\mathcal{D} = \{0, 1, ..., W+1\}$. The state transition in FIG. 2, which depends on the header type $a_C$, the transmission status $\bar{s}_T$ and the compressibility $s_S$, is then defined as:

$$p(\bar{s}_D = W+1 | s_D = W+1) = 1[\bar{s}_T = 0 | a_C \neq 0], \quad (1a)$$

$$p(\bar{s}_D = 0 | = W+1) = 1[\bar{s}_T = 1 \& a_C = 0], \quad (1b)$$

$$p(\bar{s}_D = 0 | s_D = l) = 1[\bar{s}_T = 1 \& (s_S = 1 | a_C \neq 2)], \ l=0, \ldots, W-1 \quad (1c)$$

$$p(\bar{s}_D = l+1 | s_D = l) = 1[\bar{s}_T = 0 \& s_S = 1], \ l=0, \ldots, W-2 \quad (1d)$$

$$p(\bar{s}_D = W | s_D = l) = 1[s_S = 0 \& (\bar{s}_T = 0 | a_C = 2)], \ l=0, \ldots, W-2 \quad (1e)$$

$$p(\bar{s}_D = W | s_D = W-1) = 1[\bar{s}_T = 0 | (s_S = 0 \& a_C = 2)], \quad (1f)$$

$$p(\bar{s}_D = W | s_D = W) = 1[\bar{s}_T = 0 | a_C = 2], \quad (1g)$$

$$p(\bar{s}_D = 0 | s_D = W) = 1[\bar{s}_T = 1 | a_C \neq 2]. \quad (1h)$$

Bidirectional Trans-Layer ROHC System

Figure 3A:
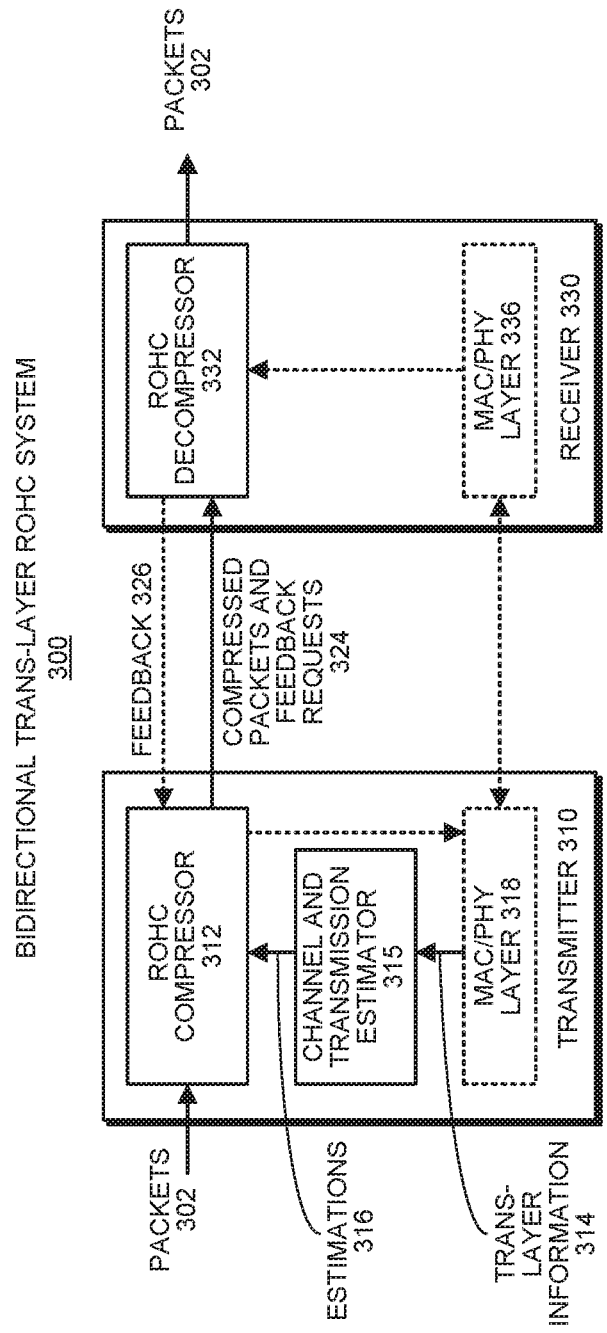
FIG. 3A illustrates a design for a bidirectional trans-layer ROHC system in accordance with the disclosed embodiments.

A high-level diagram of our bidirectional trans-layer ROHC system 300 appears in FIG. 3A. System 300 includes a transmitter 310 and a receiver 330, which communicate with each other through a channel, such as a wireless link (not shown). Transmitter 310 includes a trans-layer ROHC compressor 312, which communicates with a corresponding ROHC decompressor 332, which is part of receiver 330. Note that both ROHC compressor 312 and ROHC decompressor 332 can be defined to be within layer 2 of the seven-layer Open Systems Interconnection (OSI) computer networking model. Moreover, ROHC compressor 312 operates through lower-level networking mechanisms in MAC/PHY layer 318, which operate in layers 1 and 2 in the OSI model. Similarly, ROHC decompressor 332 operates through lower-level networking mechanisms in MAC/PHY layer 336, which similarly operate in layers 1 and 2 of the OSI model. During operation, ROHC compressor 312 receives packets-to-be transmitted 302 and generates packets with compressed headers and feedback requests 324, which are communicated to ROHC decompressor 332. ROHC decompressor 332 decompresses the compressed packets 324 to restore packets 302. During the compression process, transmitter 310 feeds trans-layer information 314 obtained by MAC/PHY layer 318 through a channel and transmission estimator 315 to produce estimations 316 about the state of the channel and the state of ROHC decompressor 332. These estimations 316 and feedback 326 from ROHC decompressor 332 are used by ROHC compressor 312 to perform the compression operation as is described in more detail below.

Figure 3B:
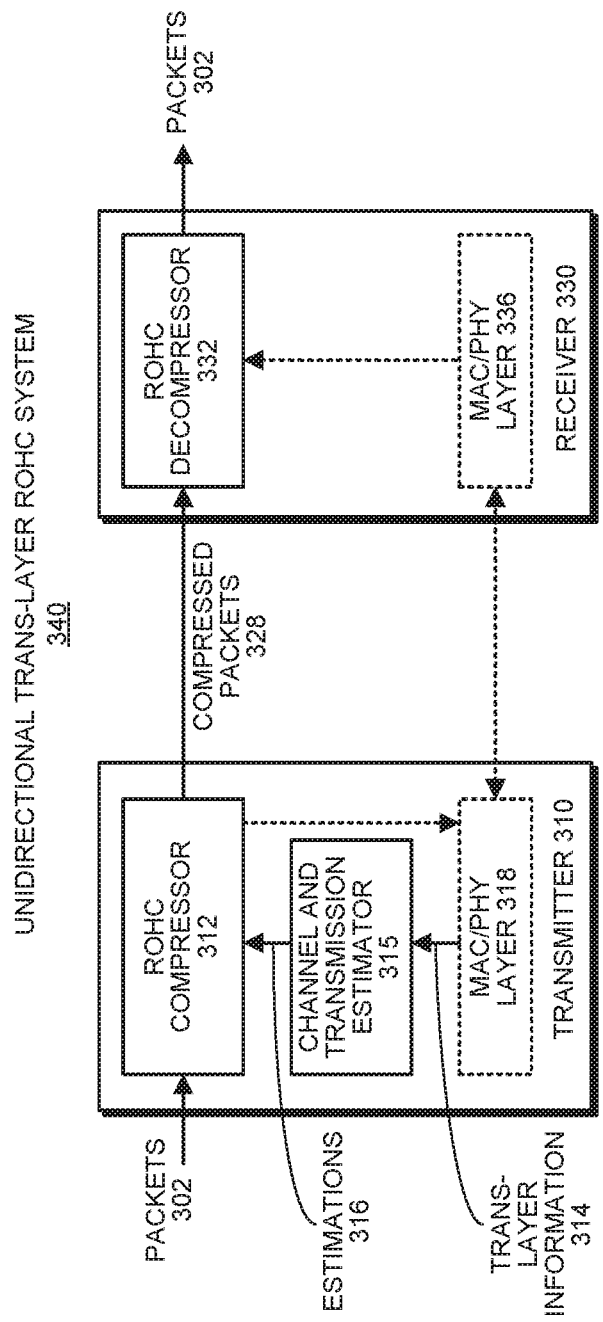
FIG. 3B illustrates a design for a unidirectional trans-layer ROHC system in accordance with the disclosed embodiments.

FIG. 3B illustrates a design for a unidirectional trans-layer ROHC system 340 in accordance with the disclosed embodiments. The unidirectional system illustrated in FIG. 3B is the same as the bidirectional system illustrated in FIG. 3A, except that there is no feedback 326 from ROHC decompressor 332 to ROHC compressor 312, and only compressed packets 328 (and no feedback requests) are sent from ROHC compressor 312 to ROHC decompressor 332. Hence, the ROHC compressor 312 illustrated in FIG. 3B does not make use of any feedback (and does not send any feedback requests) while performing compression operations.

Figure 4A:
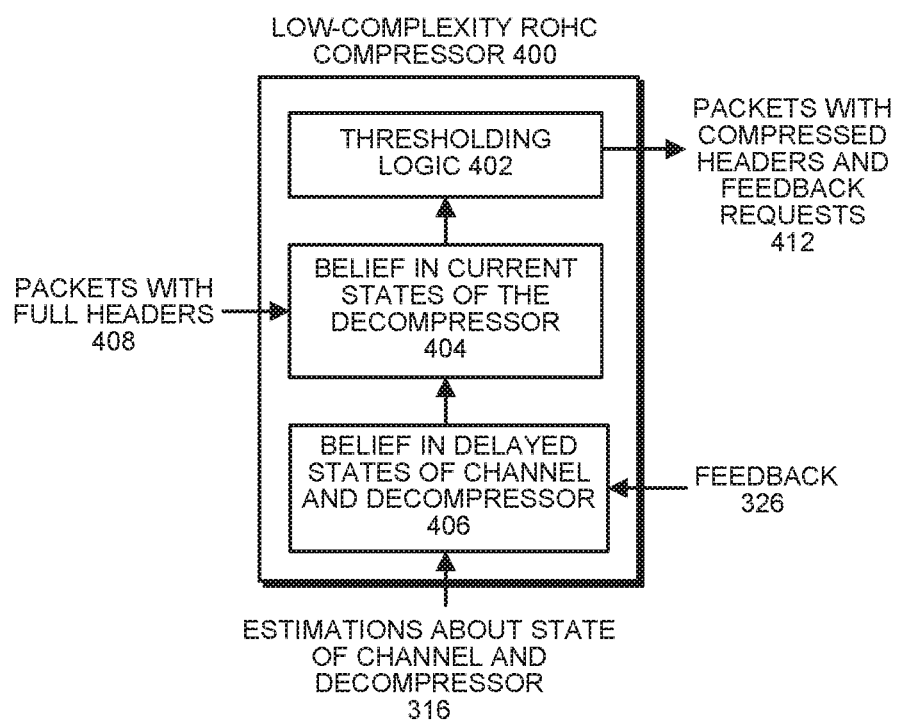
FIG. 4A illustrates a design for a low-complexity ROHC compressor in accordance with the disclosed embodiments.

The ROHC compressor 312, which is illustrated in FIG. 3A can be implemented as a low-complexity ROHC compressor 400 as is illustrated in FIG. 4A. During operation, low-complexity ROHC compressor 400 receives estimations about the state of the channel and the decompressor 316, which are generated by channel transmission estimator 315 in FIGS. 3A-3B, along with sporadically received feedback 326 from ROHC decompressor 332. Low-complexity ROHC compressor 400 uses these inputs to generate a belief in the delayed states of the channel and decompressor 406, and then to generate a belief in the current states of the decompressor 404, which feeds into thresholding logic 402 and is used to generate packets with compressed headers based on packets with full headers 408 and also to generate feedback requests 412.

Figure 4B:
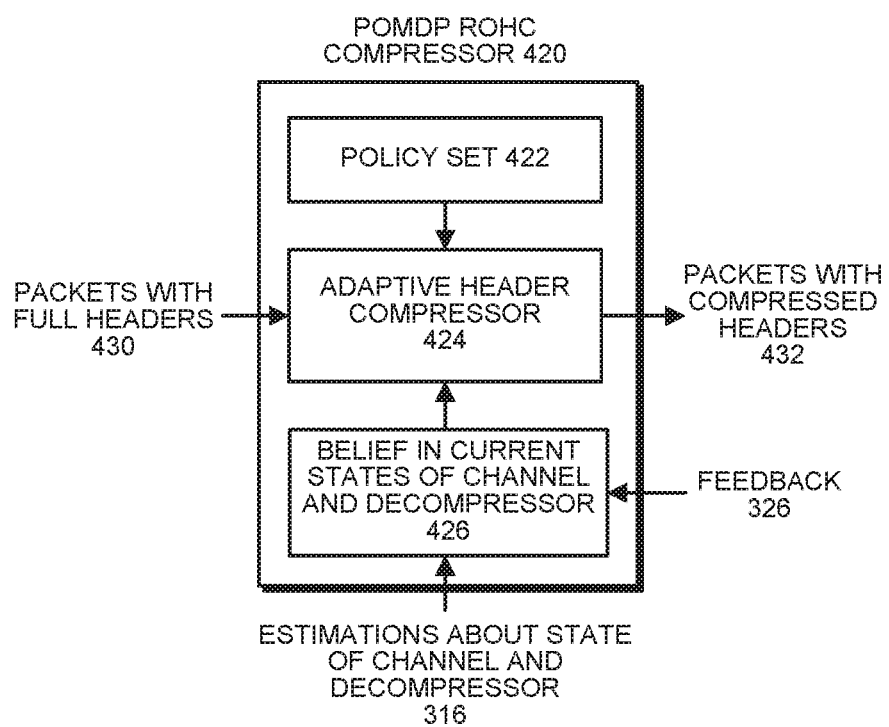
FIG. 4B illustrates a design for a POMDP ROHC compressor in accordance with the disclosed embodiments.

ROHC compressor 312 can alternatively be implemented as a more-complex POMDP ROHC compressor 420 as is illustrated in FIG. 4B. During operation, POMDP ROHC compressor 420 receives estimations about the state of the channel and the decompressor 316 along with sporadically received feedback 326 from ROHC decompressor 332. POMDP ROHC compressor 420 uses these inputs to generate a belief in the current states of the channel and decompressor 426, which feeds into an adaptive header compressor 424. Adaptive header compressor 424 uses this belief 426 along with a policy set 422 to convert packets with full headers 430 into packets with compressed headers 432.

Figure 5:
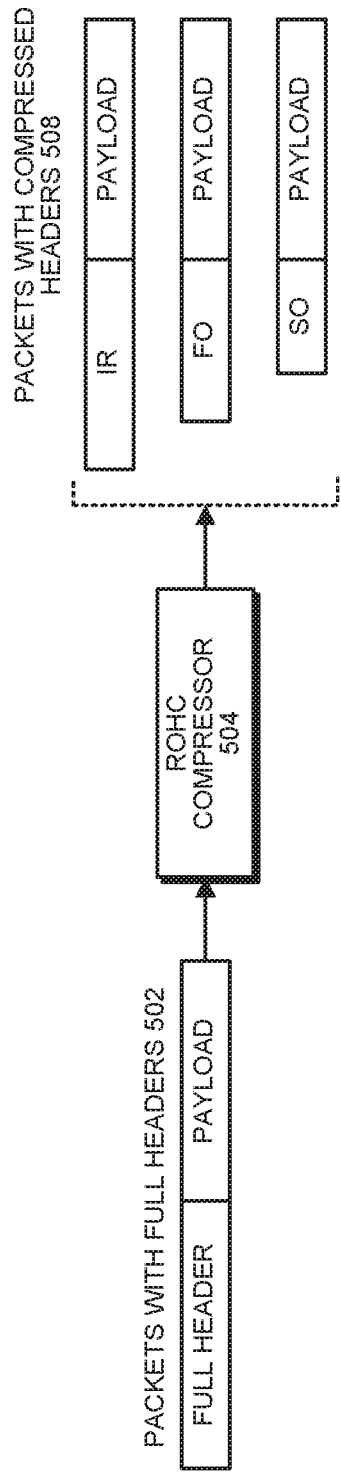
FIG. 5 illustrates packets with different levels of header compression in accordance with the disclosed embodiments.

FIG. 5 illustrates packets with different levels of header compression in accordance with the disclosed embodiments. During operation, ROHC compressor 504 compresses a set of packets with full headers 502 to produce a set of packets with compressed headers 508, wherein the compressed headers can have variable sizes IR, FO and SO, which are described as follows. Note that ROHC compressor 504 always starts in an Initialization and Refresh (IR) state by transmitting IR packets, the headers of which are not compressed, to establish context synchronization. First-Order (FO) packets are usually partially compressed and contain differential information about the dynamic fields and, occasionally, a few static fields to efficiently communicate irregularities in the packet stream. Finally, the headers of the Second-Order (SO) packets are fully compressed.

Exploiting Trans-Layer Information

In this work, we propose to apply the POMDP framework to exploit trans-layer information as input for controlling ROHC. Note that in addition to the requested feedback from the decompressor, the compressor also relies on the channel state and the transmission status estimation, which can be derived from channel quality information (CQI), hybrid-ARQ (HARQ) feedback, frequency of header context initialization, occasional decompression state feedback, etc. The trans-layer information is complementary to the ROHC feedback in that it is less informative but is almost free and could tremendously alleviate the feedback overhead. The imperfect trans-layer observations are modeled as follows:

(1) The channel state estimation $z_H \in \mathcal{K}$ is characterized by $p(z_T|\bar{s}_H) = \{E_H\}_{z_H \bar{s}_H}$, where $E_H$ is the channel observation matrix.

(2) The transmission status estimation $z_T \in \mathcal{E}$ is characterized by $$p(z_T | \bar{s}_H) = \begin{bmatrix} 1 - P_{FA} & P_{FA} \\ P_{MD} & 1 - P_{MD} \end{bmatrix}.$$

Another practical assumption is that $z_T$ and $z_H$ arrive with a delay of d packets.

In comparison, the ROHC feedback $z_D \in \mathcal{D}_b = \{-1, 0, \ldots, W+1\}$ is assumed to be able to precisely reflect the decompressor's state when requested, i.e. $z_D \in \mathcal{D}_b$ corresponds to the decompressor state defined in FIG. 2, except for $z_D = -1$ which denotes no feedback reception. It is also assumed that the ROHC feedback is received by the compressor with a delay of d packets, which is the same as the trans-layer observation delay.

A POMDP Formulation

Our POMDP design objective is to find the header compression and feedback request policy to maximize the ROHC transmission efficiency penalized by the feedback overhead, i.e. $\max_\pi \eta - \lambda \theta$ where $$\eta = \mathbb{E}\left[\frac{\sum_{m=0}^{\infty} L_p 1[s_D[m] = 0]}{\sum_{m=0}^{\infty} L_{a_C[m]}}\right] \quad (2)$$

denotes the expected ratio between the number of successfully decompressed payload bytes and the number of total bytes transmitted, $\theta$ denotes the expected feedback requested per packet, and $\lambda$ is a trade-off parameter to adjust between efficiency and feedback. Here, $s_D[m] \in \mathcal{D}$ denotes the decompressor's state after receiving the m-th packet, where $s_D[m] = 0$ represents a successful decompression.

Figure 6:
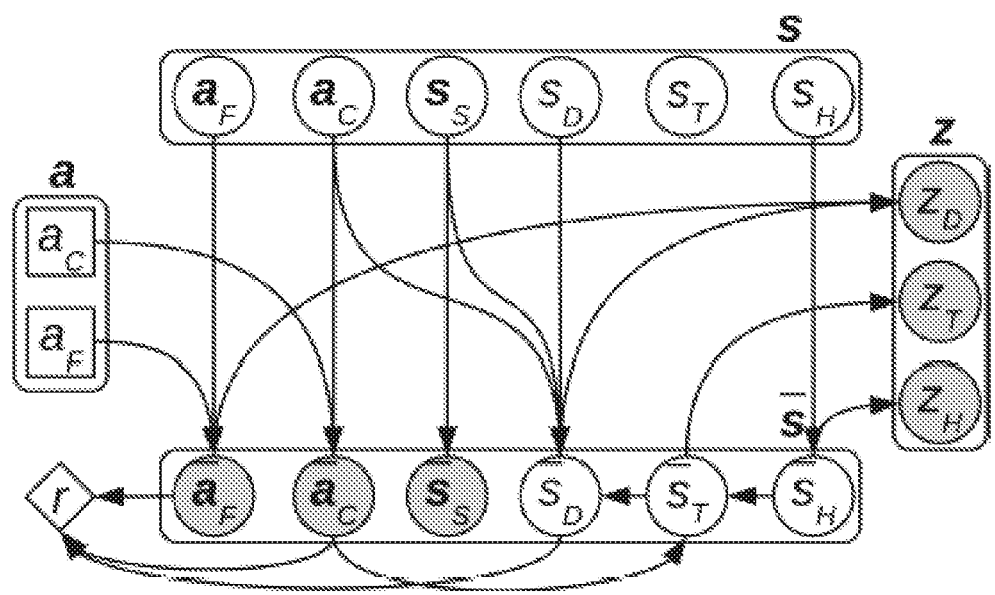
FIG. 6 presents a DBN diagram for a POMDP-based bidirectional ROHC in accordance with the disclosed embodiments.

Our POMDP formulation is demonstrated with the dynamic Bayesian network (DBN) shown in FIG. 6, which is rigorously defined by the tuple $[\mathcal{S}, \mathcal{A}, \mathcal{Z}, \mathcal{T}, \mathcal{R}, \mathcal{S}]: \mathcal{A}, \mathcal{Z}, \mathcal{O}$, specifically:

$\mathcal{S}$ denotes the set of states $s = (a_F, a_C, s_S, s_D, s_T, s_H) \in \mathcal{S} = \mathcal{E}^{d+1} \times \mathcal{T}^d \times \mathcal{E}^{d+1} \times \mathcal{D} \times \mathcal{E} \times \mathcal{K}$. To address the delayed observations, $s_D = s_D[t-d]$, $s_T = s_T[t-d]$ and $s_H = s_H[t-d]$ denote the state of the decompressor, the transmission status, the channel state and the state of the header source from d packets ago. $s_S = (s_S[t], \ldots, s_S[t-d])$ denotes the state of the compressibility for the next header to transmit and the previous d headers, which is fully observable to the ROHC compressor. We also include in the state space of our POMDP formulation $a_F = (a_F[t-1], \ldots, a_F[t-d-1])$ and $a_C = (a_C[t-1], \ldots, a_C[t-d])$, which denote the history of the feedback request action up to d+1 packets ago and that of the compression action up to d packets ago, respectively.

$\mathcal{A}$ denotes the set of actions $a = (a_C, a_F) \in \mathcal{A} = \mathcal{T} \times \mathcal{E}$. The actions taken by the compressor are twofold. First, the compressor selects the header types for the next packet to transmit, i.e. $a_C \in \mathcal{T} = \{0, 1, 2\}$. Second, the compressor determines whether or not to request feedback from the decompressor, denoted by $a_F \in \mathcal{E} = \{1, 0\}$, respectively.

$\mathcal{Z}$ denotes the set of observations $z = (\mathcal{Z}_T, \mathcal{Z}_H, \mathcal{Z}_D) \in \mathcal{Z} = \mathcal{E} \times \mathcal{K} \times \mathcal{D}_b \times \mathcal{E}$. Note that $\mathcal{Z}_T$, $\mathcal{Z}_H$ and $\mathcal{Z}_D$ represent delayed observations of the transmission status, the channel state and the decompressor's state, respectively.

The transition function $T(s,a,\bar{s}) = p(\bar{s}|s,a)$ denotes the transition probability from s to $\bar{s}$ given $a \in \mathcal{A}$, which is defined as:

$$T(s,a,\bar{s}) = p(\bar{s}_S|s_S)p(\bar{s}_H|s_H)p(\bar{s}_D|s_D,\bar{s}_T,a_C[t-d],s_S[t-d]) \\ p(\bar{s}_T|a_C[t-d],\bar{s}_H) \cdot \chi(a_F, a_F, \bar{a}_F) \cdot \chi(a_C, a_C, \bar{a}_C), \quad (3)$$

where $$p(\bar{s}_S|s_S) = p(\bar{s}_S[t]|s_S[t]) 1[\bar{s}_S[t-1] = s_S[t], \ldots, \\ \bar{s}_S[t-d-1] = s_S[t-d]] \quad (4)$$

and $p(\bar{s}_H|s_H)$ and $p(\bar{s}_T|a_C[t-d],\bar{s}_H)$ are defined above while $p(\bar{s}_D|s_D,\bar{s}_T,s_S[t-d], a_C[t-d])$ is defined by the FSM model depicted in FIG. 1. We also use the indicator function introduced above to define a new function representing the rule of consistent action history, i.e.

$$\chi(a,a,\bar{a}) = 1[(\bar{a}_0 = a, \bar{a}_1 = a_0, \ldots, \bar{a}_m = a_{m-1}] \quad (5)$$

The observation function $O(\bar{s},a,z) = p(\bar{s},a)$ denotes the probability of observing $z \in \mathcal{Z}$ in state $\bar{s}$ after action a, which is defined as:

$$O(\bar{s},a,z) = p(\mathcal{Z}_H|\bar{s}_H) p(\mathcal{Z}_T|\bar{s}_T) \\ 1[(\mathcal{Z}_D = -1 \& \bar{a}_F[t-d-1] = 0) | (z_D = \bar{s}_D \& \bar{a}_F[t-d-1] = 1)], \quad (6)$$

where $p(z_H|\bar{s}_H)$ and $p(z_T|\bar{s}_T)$ are defined above.

The reward function $R(s,a,\bar{s})$ represents the immediate reward gained by moving from $s$ to $\bar{s}$ given action $a$. By approximating the transmission efficiency $\eta$ defined in Eq. (2) with the expected discounted sum of instantaneous transmission efficiency:

$$\tilde{\eta} = \sum_{m=0}^{\infty} \gamma^m \mathbb{E}\left[\frac{L_p 1[s_D[m] = 0]}{L_{a_C[m]}}\right]. \tag{7}$$

Consequently, our optimal control framework based on infinite-horizon POMDP is completed with the definition of reward function:

$$R(s,a,\bar{s}) = L_P/L(a_C[t-d]) \cdot 1[\bar{s}_D = 0] - \lambda \cdot 1[\bar{a}_F[t-d-1] = 1]. \tag{8}$$

To give readers a better conception of how our trans-layer ROHC system works, we provide two examples of sequences of state transitions, actions and observations following FIG. 6.

The sequence of operations of the POMDP framework is as follows: at each time slot t, the ROHC compressor keeps track of the belief in the unobservable states, denoted as $q(s_U)$, where $s_U = (s_D, s_T, s_H)$, as well as the exact state of the observable states, denoted as $s_O = (a_F, a_C, s_S)$. It chooses the best action to take according to the solution to POMDP policy, which is a mapping from the belief space over $s_U$ and the state space of $s_S$, namely $a = \hat{\pi}(q_U, s_O)$, where $q_U$ is a $|\mathcal{S}_U|$ dimensional vector representing $\{q(s_U)\}|\{q(s_U)\}|_{s_r \in \mathcal{S}_r}$ and $\mathcal{S}_u$ denotes the state space of $s_u$. After taking the action to trigger a state transition and then observing z, the compressor updates its belief regarding the unobserved states:

$$q_{t+1}(\bar{s}_U) = [p(z \mid a)]^{-1} O(\bar{s}_U, a, z \mid \bar{s}_O) \sum_{s_U \in \mathcal{S}_U} T(s_U, a, \bar{s}_U \mid s_O) q_t(s_U), \tag{9a}$$

$$\forall \bar{s}_U \in \delta_U$$

$$p(z \mid a) = \sum_{\beta \in \mathcal{S}_U} O(\beta, a, z \mid \bar{s}_O) \sum_{s_U \in \mathcal{S}_U} T(s_U, a, \beta \mid s_O) q_t(s_U). \tag{9b}$$

where $$T(s_U, a, \bar{s}_U \mid s_O) = p(\bar{s}_H \mid s_H) p(\bar{s}_D \mid s_D, \bar{s}_T, a_C[t-d], s_S[t-d]) p(\bar{s}_T \mid a_C[t-d], \bar{s}_H) \tag{10a}$$

$$O(\bar{s}_U, a, z \mid \bar{s}_O) = O(\bar{s}, a, z), \tag{10b}$$

$\bar{s}_O$ are also observed directly. Then the POMDP enters timeslot t+1.

Additional details of the above-described trans-layer bidirectional ROHC scheme are described in U.S. Provisional Patent Application Ser. No. 62/502,373, entitled "Trans-Layer Bi-Directional Robust Header Compression (ROHC) Compressor System," by inventors Zhi Ding and Wenhao Wu, which is incorporated by reference herein.

Compression Process

Figure 7:
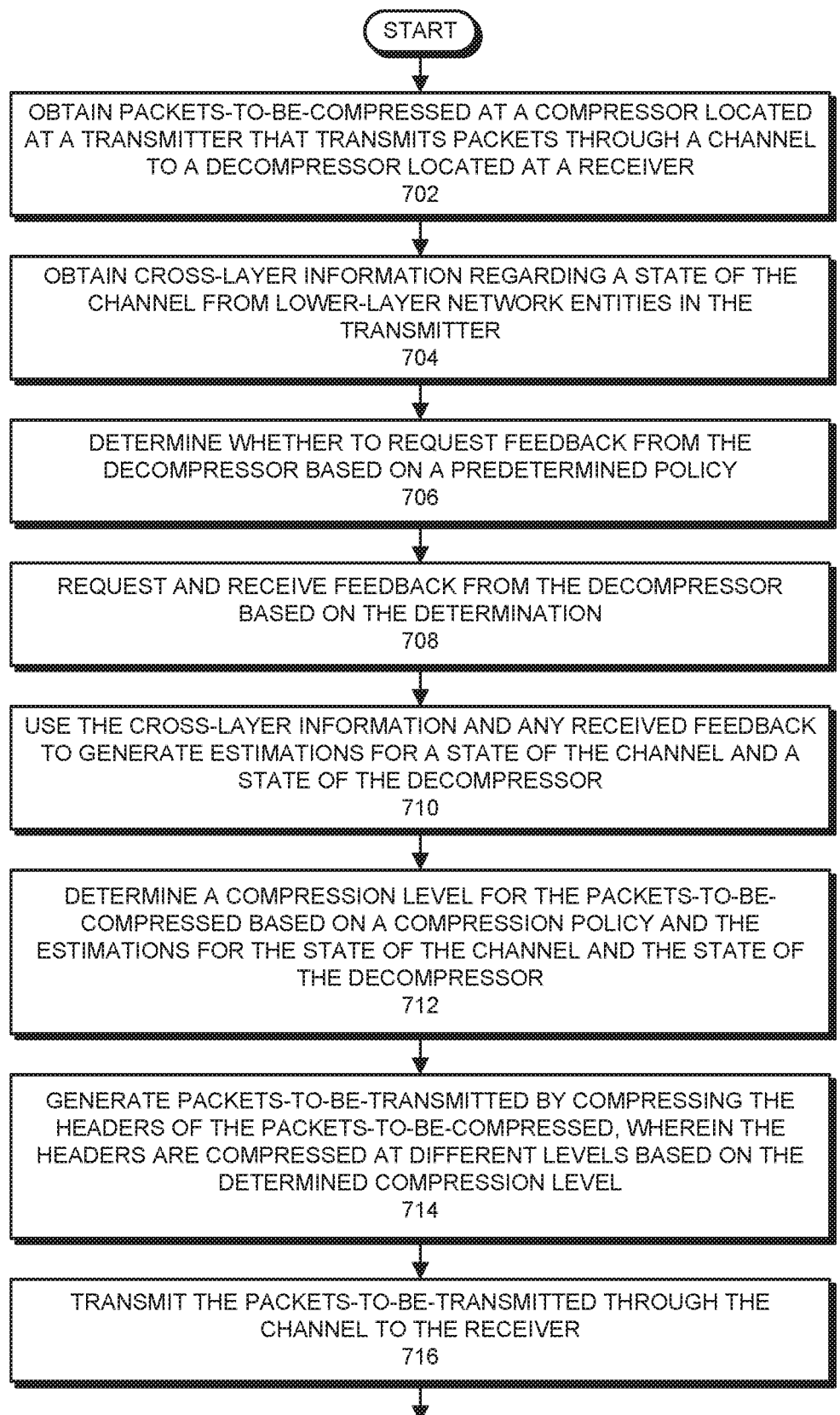
FIG. 7 presents a flow chart illustrating the process of operating a bidirectional trans-layer ROHC system in accordance with the disclosed embodiments.

FIG. 7 presents a flow chart illustrating the process of operating a bidirectional trans-layer ROHC system in accordance with the disclosed embodiments. During operation, the system obtains packets-to-be-compressed at a compressor located at a transmitter that transmits packets through a channel to a decompressor located at a receiver (step 702). The system also obtains cross-layer information regarding a state of the channel from lower-layer network entities in the transmitter (step 704). The system then determines whether to request feedback from the decompressor based on a predetermined policy (step 706), and requests and receives feedback from the decompressor based on the determination (step 708). Next, the system uses the cross-layer information and any received feedback to generate estimations for a state of the channel and a state of the decompressor (step 710). The system also determines a compression level for the packets-to-be-compressed based on a compression policy and the estimations for the state of the channel and the state of the decompressor (step 712). Finally, the system generates the packets-to-be-transmitted by compressing the headers of the packets-to-be-compressed, wherein the headers are compressed at different levels based on the determined compression level (step 714), and then transmits the packets-to-be-transmitted through the channel to the receiver (step 716).

Figure 8:
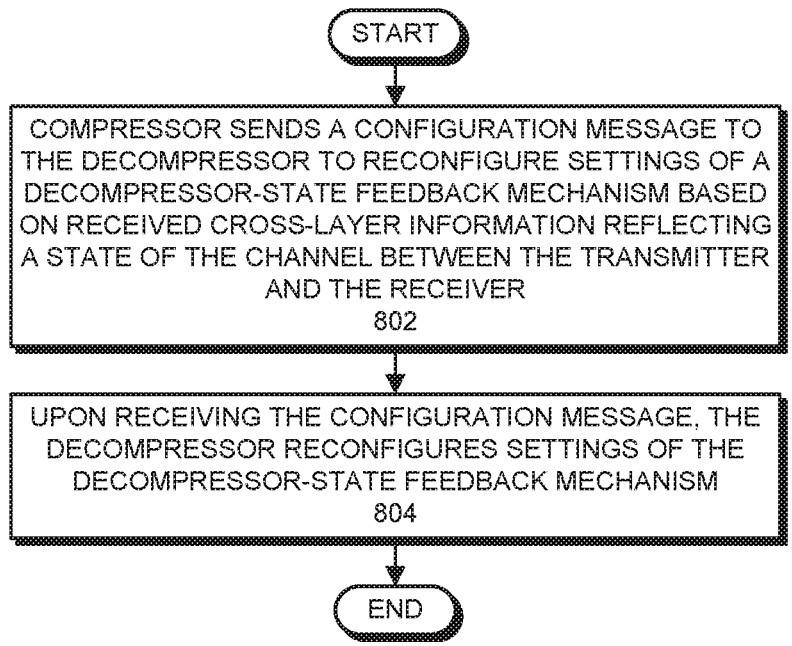
FIG. 8 presents a flow chart illustrating operations associated with sending a reconfiguration message to a decompressor-state feedback mechanism in accordance with the disclosed embodiments.

FIG. 8 presents a flow chart illustrating operations associated with the process of sending a reconfiguration message to a decompressor-state feedback mechanism in accordance with the disclosed embodiments. During this process, the compressor sends a configuration message to the decompressor to reconfigure settings of a decompressor-state feedback mechanism based on received cross-layer information reflecting a state of the channel between the transmitter and the receiver (step 802). Upon receiving the configuration message, the decompressor reconfigures settings of the decompressor-state feedback mechanism (step 804).

Figure 9:
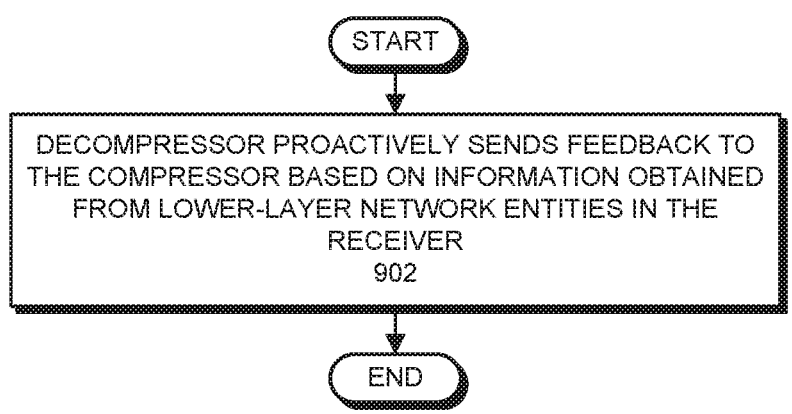
FIG. 9 presents a flow chart illustrating proactively sending feedback from the decompressor to the compressor in accordance with the disclosed embodiments.

FIG. 9 presents a flow chart illustrating the process of proactively sending feedback from the decompressor to the compressor in accordance with the disclosed embodiments. During this process, the decompressor proactively sends feedback to the compressor based on information obtained from lower-layer network entities in the receiver (step 902).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for compressing packets, comprising:
   obtaining packets-to-be-compressed at a compressor located at a transmitter that transmits packets through a channel to a decompressor located at a receiver;
   obtaining cross-layer information regarding a state of the channel from lower-layer network entities in the transmitter;
   determining whether to request feedback from the decompressor based on a predetermined policy;
   requesting and receiving feedback from the decompressor based on the determination;
   using the cross-layer information and any received feedback to generate estimations for a state of the channel and a state of the decompressor;
   determining a compression level for the packets-to-be-compressed based on a compression policy and the estimations for the state of the channel and the state of the decompressor;
   generating packets-to-be-transmitted by selectively compressing the headers of the packets-to-be-compressed, wherein the headers are compressed at different levels based on the determined compression level; and transmitting the packets-to-be-transmitted through the channel to the receiver.

2. The method of claim 1, wherein determining the compression level and whether to request the feedback involves thresholding soft belief information on a current state of the decompressor.

3. The method of claim 1, wherein determining the compression level and whether to request the feedback involves using a partially observable Markov decision process (POMDP) to select an action based on a pre-computed policy set and belief information on the state of the channel and the state of the decompressor.

4. The method of claim 1, wherein generating the estimations for the state of the channel and the state of the decompressor involves using a Markov state transition model.

5. The method of claim 1, wherein the method further comprises:
  determining whether to reconfigure feedback settings of the decompressor based on the cross-layer information; and
  if a determination is made to reconfigure the feedback settings, sending a reconfiguration message to the decompressor to reconfigure settings of a decompressor-state feedback mechanism.

6. The method of claim 5, wherein the received cross-layer information is received from lower-layer network entities in the transmitter.

7. The method of claim 5, wherein the received cross-layer information is obtained from feedback sent by the receiver and includes cross-layer information from lower-layer network entities in the receiver.

8. The method of claim 5, wherein upon receiving the reconfiguration message, the receiver reconfigures settings of the decompressor-state feedback mechanism.

9. The method of claim 8, wherein the reconfiguration is at least partly based on cross-layer information obtained from lower-layer network entities in the receiver.

10. The method of claim 1, wherein generating the packets-to-be-transmitted additionally involves compressing portions of packet payloads for which latency is critical.

11. The method of claim 1, wherein the method further comprises proactively sending feedback from the receiver to the transmitter based on information obtained from lower-layer network entities in the receiver.

12. The method of claim 1, wherein the different levels of header compression include the following:
  no header compression;
  partial header compression; and
  full header compression.

13. The method of claim 1, wherein compressing the headers includes using a Window-based Least Significant Bit (WLSB) technique to compress the headers.

14. The method of claim 1, wherein the cross-layer information comprises one or more of the following:
  a state transition probability of the channel;
  packet error rates under different channel states;
  channel state estimation; and
  transmission-status estimation.

15. The method of claim 14, wherein the cross-layer information is derived from one or more of the following:
  a physical-layer channel model;
  modulation and coding schemes;
  Automatic Repeat Request (ARQ) feedback;
  Hybrid ARQ (HARM) feedback;
  packet segmentation information; and
  packet concatenation information.

16. The method of claim 1, wherein the lower-layer network entities comprise MAC/PHY layer entities in the transmitter.

17. A system that compresses and transmits packets, comprising:
  a transmitter that transmits packets through a channel to a receiver; and
  a compressor within the transmitter that compresses the packets prior to transmission;
  wherein during operation, the transmitter:
    obtains packets-to-be-compressed,
    obtains cross-layer information regarding a state of the channel from lower-layer network entities in the transmitter,
    determines whether to request feedback from the decompressor based on a predetermined policy,
    requests and receives feedback from the decompressor based on the determination,
    uses the cross-layer information and any received feedback to generate estimations for a state of the channel and a state of the decompressor,
    determines a compression level for the packets-to-be-compressed based on a compression policy and the estimations for the state of the channel and the state of the decompressor,
    generates packets-to-be-transmitted by selectively compressing the headers of the packets-to-be-compressed, wherein the headers are compressed at different levels based on the determined compression level, and
    transmits the packets-to-be-transmitted through the channel to the receiver.

18. The system of claim 17, wherein while determining the compression level and whether to request the feedback, the compressor thresholds soft belief information on a current state of the decompressor.

19. The system of claim 17, wherein while determining the compression level and whether to request the feedback, the compressor uses a partially observable Markov decision process (POMDP) to select an action based on a pre-computed policy set and belief information on the state of the channel and the state of the decompressor.

20. The system of claim 17, wherein generating the estimations for the state of the channel and the state of the decompressor involves using a Markov state transition model.

21. The system of claim 17, wherein the transmitter is designed to:
  determine whether to reconfigure feedback settings of the decompressor based on the cross-layer information; and
  if a determination is made to reconfigure the feedback settings, send a reconfiguration message to the decompressor to reconfigure settings of a decompressor-state feedback mechanism.

22. The system of claim 17, wherein generating the packets-to-be-transmitted additionally involves compressing portions of packet payloads for which latency is critical.

23. The system of claim 17, wherein the receiver is configured to proactively send feedback to the transmitter based on information obtained from lower-layer network entities in the receiver.

24. A method for reconfiguring a decompressor in a system that selectively compresses and transmits packets from a transmitter through a channel to a receiver, which contains the decompressor, comprising:
  obtaining cross-layer information at the transmitter regarding a state of the channel from lower-layer network entities in the transmitter;

determining whether to reconfigure feedback settings of the decompressor based on the received cross-layer information;

if a determination is made to reconfigure the feedback settings, sending a reconfiguration message from the transmitter to the decompressor to reconfigure settings of a decompressor-state feedback mechanism; and receiving feedback from the decompressor, wherein the feedback is subsequently used determine a compression level for packets-to-be-transmitted.

* * * * *

UNITED STATES PATENT AND TRADEMARK OFFICE
CERTIFICATE OF CORRECTION

Page 1 of 1

PATENT NO. : 11,019,530 B2
APPLICATION NO. : 16/495054
DATED : May 25, 2021
INVENTOR(S) : Ding et al.

It is certified that error appears in the above-identified patent and that said Letters Patent is hereby corrected as shown below:

In the Claims

Claim 15 (Column 15, Line 65), delete the word "(HARM)" and insert the word --(HARQ)--.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*